United States Patent
Ahn

(10) Patent No.: US 7,750,947 B2
(45) Date of Patent: Jul. 6, 2010

(54) IMAGE SENSOR AND METHOD FOR CONTROLLING IMAGE BRIGHTNESS DISTRIBUTION THEREIN

(76) Inventor: Hyun-Joo Ahn, 1 Hyangjeong-dong, Heungbuk-gu, Cheongju-si, Chungcheongbuk-do, 361-725 (KR)

( * ) Notice: Subject to any disclaimer, the term of this patent is extended or adjusted under 35 U.S.C. 154(b) by 619 days.

(21) Appl. No.: 11/642,594

(22) Filed: Dec. 21, 2006

(65) Prior Publication Data
US 2007/0146502 A1 Jun. 28, 2007

(30) Foreign Application Priority Data
Dec. 23, 2005 (KR) ...................... 10-2005-0128695

(51) Int. Cl.
*H04N 5/14* (2006.01)
(52) U.S. Cl. ...................... 348/222.1; 348/28; 348/672; 382/168; 382/274
(58) Field of Classification Search ........................ None
See application file for complete search history.

(56) References Cited

U.S. PATENT DOCUMENTS
2007/0053587 A1 * 3/2007 Ali .............................. 382/168

FOREIGN PATENT DOCUMENTS
JP 2001-275042 10/2001
KR 100265008 6/2000

* cited by examiner

*Primary Examiner*—David L Ometz
*Assistant Examiner*—Angel L Garces-Rivera
(74) *Attorney, Agent, or Firm*—McAndrews, Held & Malloy

(57) ABSTRACT

Provided is an image sensor that can solve the limitation in expanding an output dynamic range, which is caused when a uniform gain contrast scheme is applied, and prevent the reduction of an input dynamic range, thereby stably adjusting the distribution of image brightness. The image sensor includes a contrast gain adjuster for adjusting a brightness distribution of an image detected from a pixel array by controlling a contrast gain of an inputted pixel data. The contrast gain adjuster calculates a minimum brightness value of a dark region and a maximum brightness value of a bright region from the image brightness distribution, the dark region and the bright region being divided according to a set reference value.

40 Claims, 8 Drawing Sheets

IMAGE SENSOR AND METHOD FOR CONTROLLING IMAGE BRIGHTNESS DISTRIBUTION THEREIN

FIELD OF THE INVENTION

The present invention relates to a semiconductor device; and, more particularly, to an image sensor and a method for controlling an image brightness distribution therein.

DESCRIPTION OF RELATED ARTS

With the rapid development of video communications using Internet, a demand for digital cameras is explosively increasing. Further, with the wide distribution of mobile communication terminals, e.g., personal digital assistants (PDAs), International Mobile Telecommunications-2000 (IMT-2000) terminals, and code division multiple access (CDMA) terminals) having a camera mounted thereon, the demand of small-sized camera modules is increasing.

The camera module basically includes an image sensor. The image sensors are a device to convert optical images into electric signals. The image sensors are classified into a charge coupled device (CCD) image sensor and a complementary metal oxide semiconductor (CMOS) image sensor.

The image sensor inevitably includes an automatic exposure control function serving as the human iris. Also, the image sensor requires a brightness control function that is more intelligent and efficient under various environments.

A uniform gain contrast scheme is used to expand a dynamic range through the improvement in brightness distribution of a screen. The uniform gain contrast applies a constant gain regardless of the brightness distribution of the screen. Therefore, in the case of a low-contrast image, there is a limitation in expanding an output dynamic range. In the case of a high-contrast image, the output dynamic range is expanded because saturation phenomenon occurs in a dark or bright region. However, an input dynamic range is reduced, resulting in image degradation. In addition, although histogram equalization can obtain an image that is most optimal to the brightness distribution of the screen of the image sensor, its hardware architecture is complicated as the number of pixels increases.

FIG. 1 is a block diagram of an image sensor with a uniform gain contrast of the related arts.

Referring to FIG. 1, the image sensor of the related arts includes a pixel array 10, a correlated double sampling circuit (CDS) 20, a programmable gain amplifier (PGA) 30, an analog to digital converter (ADC) 40, a timing controller 50, a digital signal processor (DSP) 60, and a line buffer 70 serving as a storage medium. Also, the image sensor of related arts further includes a row decoder and a column decoder (not shown).

The pixel array 10 includes M×N number (where N and M are positive integers) of pixels arranged in a matrix. The pixel array 10 detects information on an externally inputted image and outputs pixel signals.

The CDS 20 removes a fixed pattern noise from the pixel signals read from the pixel array 10 through a correlated double sampling technology.

The PGA 30 converts the pixel signal from the CDS 20 into electric signals.

The ADC 40 converts the analog pixel signals from the PGA 30 into digital signals.

The timing controller 50 controls overall operations of the image sensor. The timing controller 50 controls the row decoder and the column decoder, converts data relating to its internal operations into a variety of values according to the operation environments, and controls the entire chip according to the converted data.

The DSP 60 processes the digital pixel signals outputted from the ADC 40. The DSP 60 may include a gamma corrector, a color interpolator, a color corrector, a color space converter, a uniform gain contrast adjuster 61, an auto white balance controller, an auto exposure controller, and an output formatter.

The uniform gain contrast adjuster 61 adjusts the image brightness by adding the same gain to a YCbCr data converted through the color space converter.

An operation of the image sensor of the related arts constructed as above will be described below.

The pixel signals read from the pixel array 10 are amplified to a predetermined gain value through the analog signal processor configured with the CDS 20 and the PGA 30. The amplified analog pixel signals are converted into digital signals by the ADC 40 and are outputted to the DSP 60.

The digital pixel signals inputted to the DSP 60 are processed through the gamma corrector, the color interpolator, the color corrector, and the color space converter. The color space converter converts RGB data inputted through the color corrector into YCbCr data. The uniform gain contrast adjuster 61 adjusts the image brightness by adding the same gain value to the YCbCr data outputted from the color space converter. The image data to which the same gain value is added are outputted through the output formatter.

However, using the uniform gain contrast scheme, the image sensor adjusts the image brightness by adding the same gain value, regardless of the distribution of the screen brightness. Therefore, in the case of a low-contrast image, there is a limitation in expanding an output dynamic range. In the case of a high-contrast image, an output dynamic range is expanded because saturation phenomenon occurs in a dark or bright region. However, an input dynamic range is reduced, resulting in image degradation.

SUMMARY OF THE INVENTION

It is, therefore, an object of the present invention to provide an image sensor that can solve the limitation in expanding an output dynamic range, which is caused when a uniform gain contrast scheme is applied, and prevent the reduction of an input dynamic range, thereby stably adjusting the distribution of image brightness.

It is another object of the present invention to provide a method for controlling an image brightness distribution using a dual gain contrast scheme.

In accordance with an aspect of the claimed invention, there is provided an image sensor including: a contrast gain adjuster for adjusting a brightness distribution of an image detected from a pixel array by controlling a contrast gain of an inputted pixel data, wherein the contrast gain adjuster calculates a minimum brightness value of a dark region and a maximum brightness value of a bright region from the image brightness distribution, and determines dual contrast gains of the dark region and the bright region based on the minimum brightness value and the maximum brightness value.

In accordance with another aspect of the claimed invention, there is provided an image sensor including: a pixel array for detecting an image to generate pixel data; an analog to digital converter for converting the pixel data into digital pixel data; a color space converter for converting RGB data from the analog to digital converter into YCbCr data; and a contrast gain adjuster for adjusting a brightness distribution of the image detected from the pixel array by calculating a minimum brightness value of a dark region and a maximum brightness value of a bright region from the YCbCr data, and determining dual contrast gains of the dark region and the bright region based on the minimum brightness value and the maximum brightness value.

In accordance with a further another aspect of the claimed invention, there is provided a method for controlling a brightness distribution of an image detected from a pixel array of an image sensor by adjusting a contrast gain of an inputted pixel data, including: calculating a minimum brightness value of a dark region and a maximum brightness value of a bright region, the dark region and the bright region being divided in response to a set reference value of the image brightness distribution; and determining dual contrast gains of the dark region and the bright region according to the minimum brightness value and the maximum brightness value.

In accordance with a still further another aspect of the present invention, there is provided a method for controlling a brightness distribution of an image detected from a pixel array of an image sensor by adjusting a contrast gain of an inputted pixel data, including: setting an initial minimum brightness value, an initial maximum brightness value, a brightness threshold value, and a maximum gain value; dividing the image into a dark region and a bright region based on a set reference value; calculating a minimum brightness value of the dark region and a maximum brightness value of the bright region by comparing a brightness data value of the pixel data, the initial minimum brightness value, and the initial maximum brightness value; determining a gain low value and a gain high value based on the minimum brightness value and the maximum brightness value; and selecting contrast gains to be applied to the dark region and the bright region by comparing the maximum gain value, the gain low value, and the gain high value.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

An image sensor in accordance with exemplary embodiments of the present invention will be described in detail with reference to the accompanying drawings.

Figure 1:
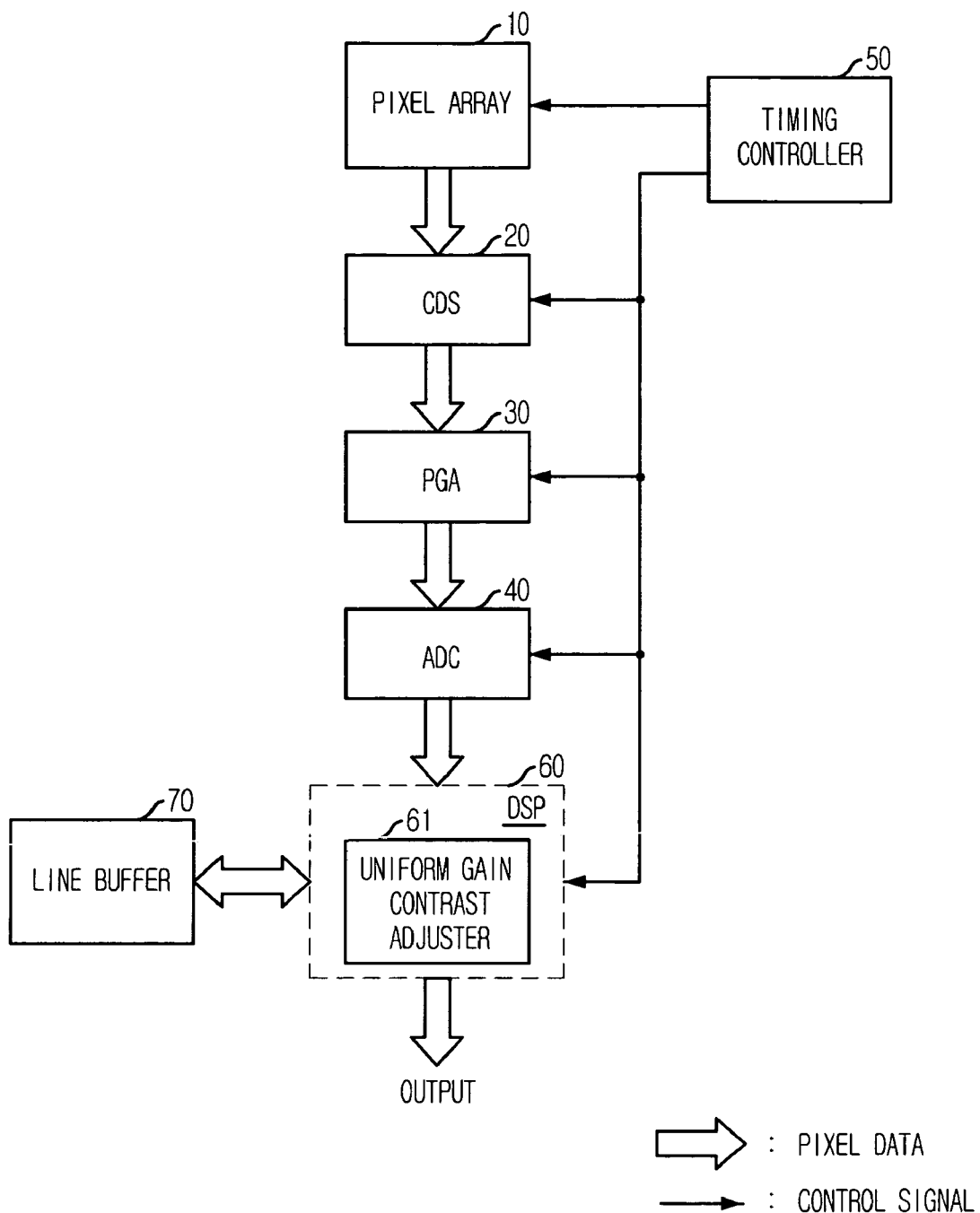
FIG. 1 is a block diagram of an image sensor with a uniform gain contrast adjuster of the related arts.
Figure 2:
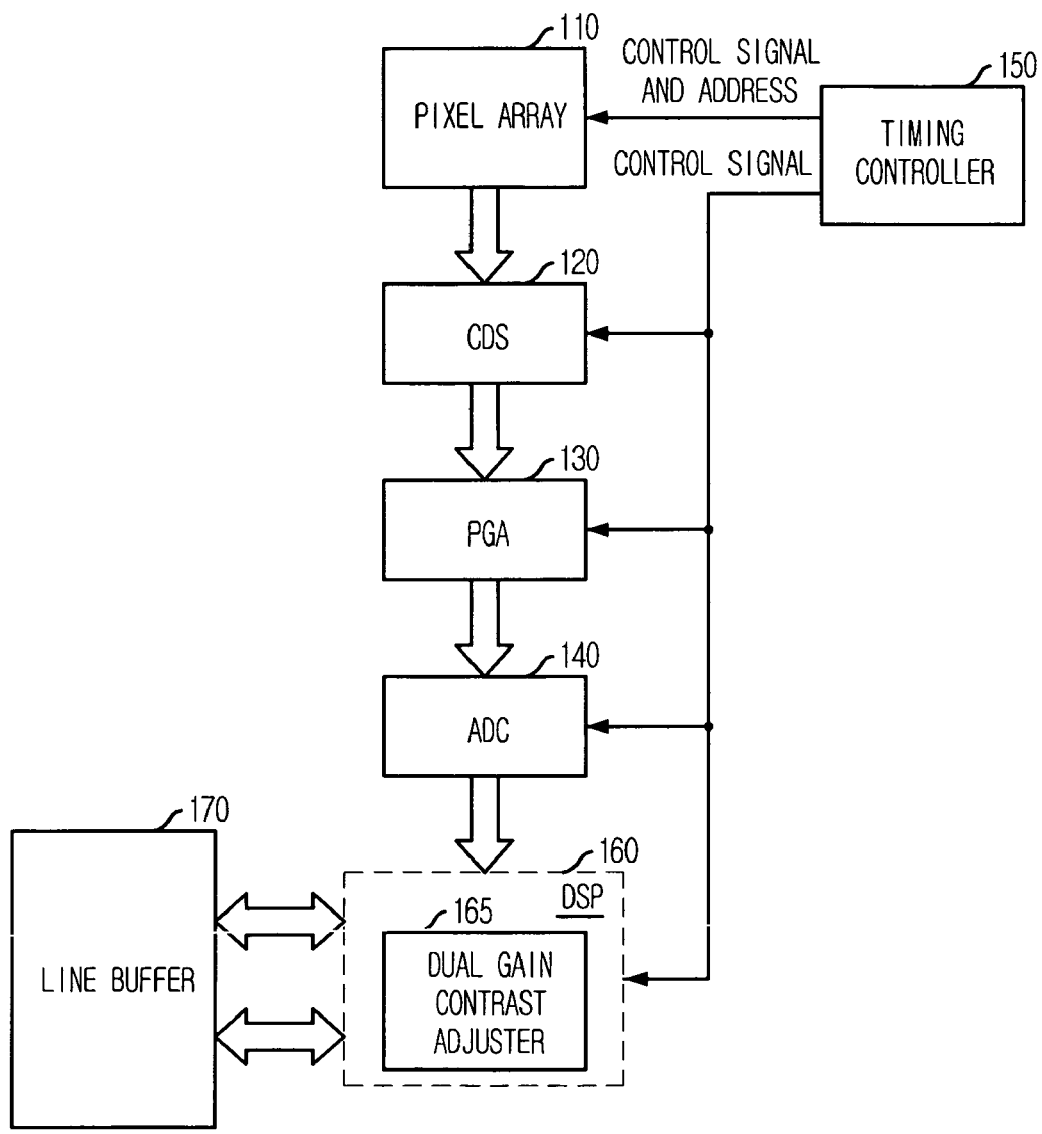
FIG. 2 is a block diagram of an image sensor with a dual gain contrast adjuster in accordance with an embodiment of the present invention.

FIG. 2 is a block diagram of an image sensor in accordance with an embodiment of the present invention.

Referring to FIG. 2, the image sensor of the claimed invention includes a dual gain contrast adjuster 165.

The dual gain contrast adjuster 165 adjusts an image brightness distribution region by determining a low level and a high level of an image. That is, among the image brightness distribution, a minimum value of a dark region and a maximum value of a brightness region are calculated. Then, contrast gains of the dark region and the bright region are determined using the calculated minimum and maximum values. Through these procedures, the image brightness distribution is adjusted. Specifically, in the case of the dark region, data is determined as a valid data only when a minimum data value is greater than a threshold that is set so as to remove noise influence. Therefore, the image brightness region can be appropriately adjusted by applying a low level gain and a high level gain to a low contrast image, a high contrast image, a bright image, and a dark image.

In further detail, the image sensor of the claimed invention includes a pixel array 110, a CDS 120 for processing pixel data outputted from the pixel array 110, a PGA 130, an ADC 140, a timing controller 150, a DSP 160 with a dual gain contrast adjuster 165, and a line buffer 170. Also, the image sensor further includes a row decoder and a column decoder for selecting pixels of the pixel array 110.

The pixel array 110 includes M×N number (where N and M are positive integers) of pixels arranged in a matrix. The pixel array 110 detects information on an externally inputted image and outputs pixel signals.

The CDS 120 removes a fixed pattern noise from the pixel signals read from the pixel array 110 through a correlated double sampling technology.

The PGA 130 converts the pixel signal from the CDS 120 into electric signals.

The CDS 120 and the PGA 130 constitute an analog processor for processing analog pixel signals.

The ADC 140 converts the analog pixel signals from the PGA 130 into digital signals.

The timing controller 150 controls overall operations of the image sensor. The timing controller 150 controls the row decoder and the column decoder, converts data relating to its internal operations into a variety of values according to the operation environments, and controls the entire chip according to the converted data.

The DSP 160 processes the digital pixel signals outputted from the ADC 140.

Figure 3:
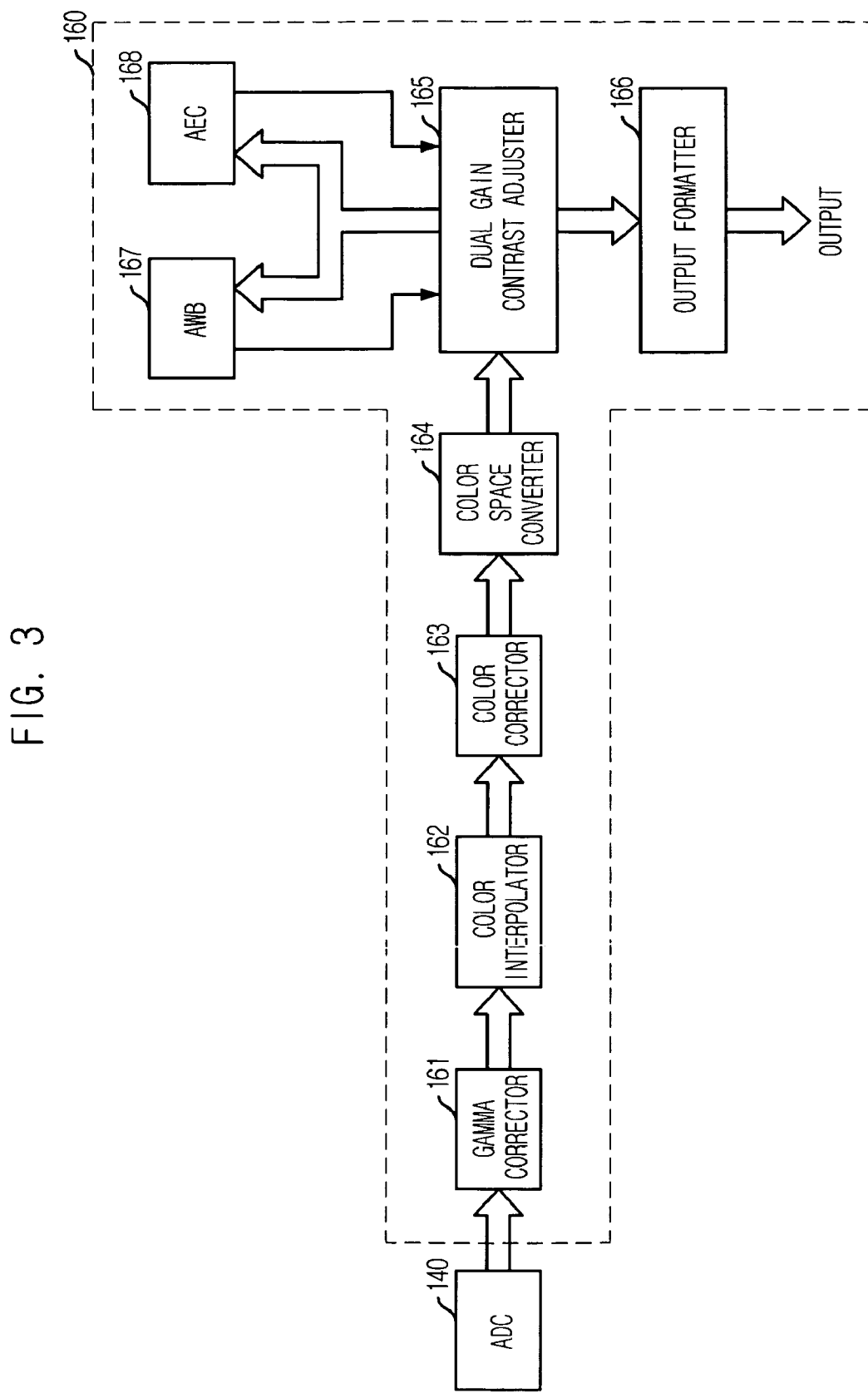
FIG. 3 is a block diagram of a digital signal processor illustrated in FIG. 2.

FIG. 3 is a block diagram of the DSP 160 illustrated in FIG. 2.

As shown in FIG. 3, the DSP 160 may include a gamma corrector 161, a color interpolator 162, a color corrector 163, a color space converter 164, a dual gain contrast adjuster 165, an auto white balance controller 167, an auto exposure controller 168, and an output formatter 166.

The color interpolator 162 converts 1-channel RGB data from the gamma corrector 161 into 3-channel RGB data.

The color corrector 163 corrects the 3-channel RGB data outputted from the color interpolator 162.

The color space converter 164 converts the 3-channel RGB data from the color interpolator 162 into YCbCr data.

The dual gain contrast adjuster 165 determines an image brightness distribution from the YCbCr data outputted from the color space converter 164, calculates a minimum value of a dark region and a maximum value of a bright region from the image brightness distribution, and determines contrast gains of the dark region and the bright region using the calculated minimum and maximum values. The image brightness distribution is adjusted by properly adding the determined contrast gains.

A method for adjusting the image brightness distribution using the dual gain contrast adjuster 165 will be described below with reference to FIG. 4.

Figure 4:
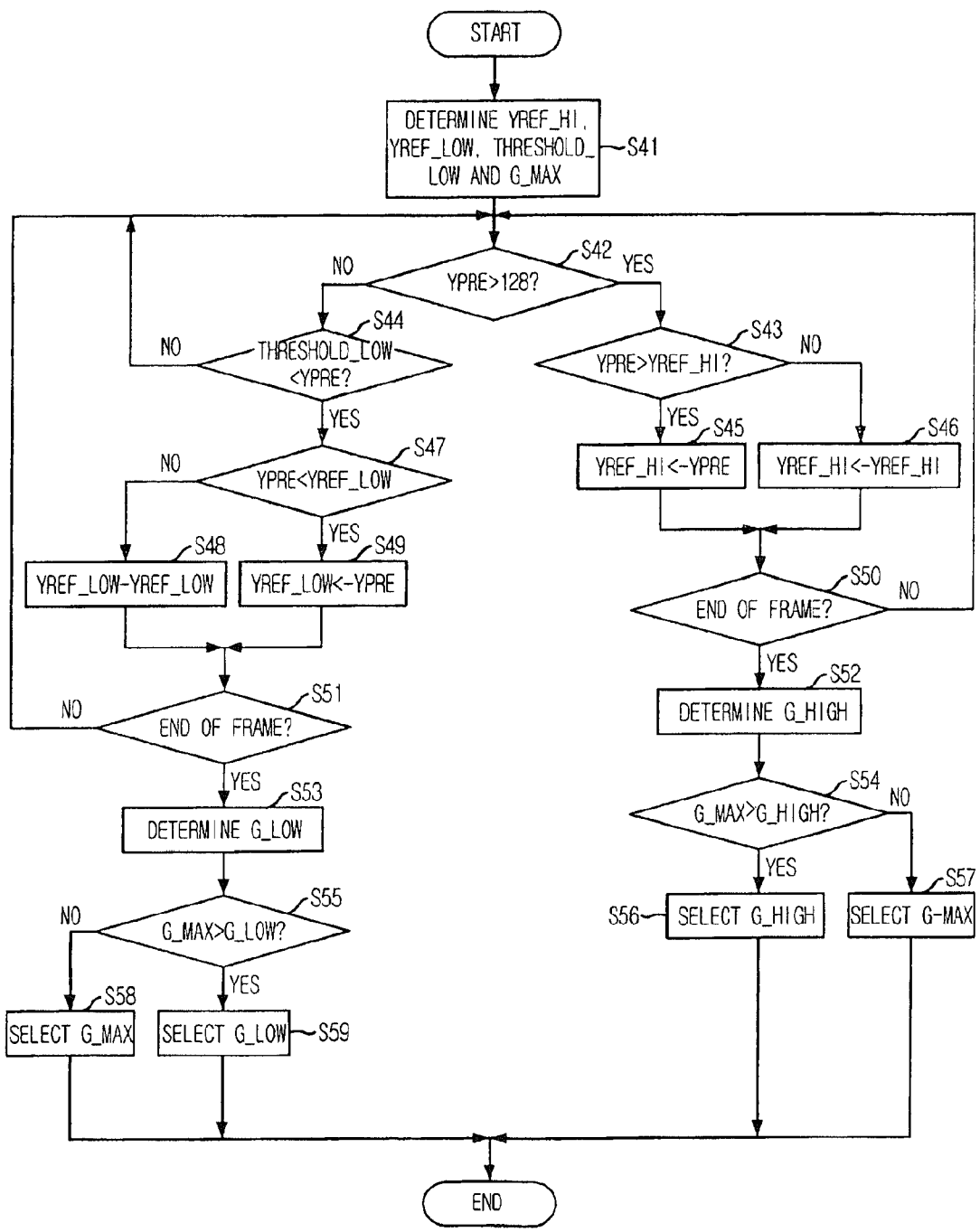
FIG. 4 is a flowchart illustrating a method for controlling the brightness of image brightness in accordance with an embodiment of the present invention.

Referring to FIG. 4, in operation S41, a maximum brightness value YREF_HI, a minimum brightness value YREF_LOW, a brightness threshold value THRESHOLD_LOW, and a maximum gain value G_MAX are determined. The maximum brightness value YREF_HI, the minimum brightness value YREF_LOW, the brightness threshold value THRESHOLD_LOW, and the maximum gain value G_MAX are previously determined by a user and stored in the line buffer 170 of FIG. 3.

In operation S42, it is determined from the output pixel data of the color space converter 164 whether or not a brightness data YPRE of a current pixel data is greater than a reference value, for example, "128" (code value).

In operation S43, when the brightness data YPRE of the current pixel data is greater than 128 in operation S42, the brightness data YPRE is compared with the maximum brightness value YREF_HI. On the contrary, in operation S44, when the brightness data YPRE is less than 128 in operation S42, the brightness data YPRE is compared with the threshold value THRESHOLD_LOW.

In operation S45, when the brightness data YPRE is greater than the maximum brightness value YREF_HI in operation S43, the maximum value YREF_HI is updated with the brightness data YPRE. On the contrary, in operation S46, when the brightness data YPRE is less than the maximum brightness value YREF_HI in operation S43, the maximum value YREF_HI is maintained as it is.

In operation S47, when the brightness data YPRE is less than the threshold value THRESHOLD_LOW in operation S44, the process returns to operation S42. On the contrary, when the brightness data YPRE is greater than the threshold value THRESHOLD_LOW, the brightness data YPRE is compared with the minimum value YREF_LOW. At this point, the brightness data YPRE is compared with the threshold value THRESHOLD_LOW so as to remove noise from the data.

In operation S48, when the brightness data YPRE is greater than the minimum value YREF_LOW in operation S47, the minimum value YREF_LOW is maintained as it is. On the contrary, in operation S49, when the brightness data YPRE is less than the minimum value YREF_LOW, the minimum value YREF_LOW is updated with the brightness data YPRE. Consequently, the minimum value YREF_LOW becomes the brightness data YPRE in operation S49.

In operations S50 and S51, the above-described procedures are repeated until 1 frame is finished. Through the repeated procedures, the final maximum value YREF_HI and the minimum value YREF_LOW within 1 frame are determined.

In operations S52 and S53, a gain high value G_HIGH is determined using the determined final maximum value YREF_HI, and a gain low value G_LOW is determined using the determined final minimum value YREF_LOW.

In operation S54, the gain high value G_HIGH is compared with the maximum gain value G_MAX. In operation S55, the gain low value G_LOW is compared with the maximum gain value G_MAX.

In operation S56, when the maximum gain value G_MAX is greater than the gain high value G_HIGH in operation S54, the gain high value G_HIGH is selected. On the contrary, in operation S57, when the maximum gain value G_MAX is less than the gain high value G_HIGH in operation S54, the maximum gain value G_MAX is selected. These selected gain values become the contrast gains at the section of YPRE>128.

In operation S58, when the maximum gain value G_MAX is less than the gain low value G_LOW in operation S55, the maximum gain value G_MAX is selected. On the contrary, in operation S59, when the maximum gain value G_MAX is greater than the gain low value G_LOW, the gain low value G_LOW is selected. These selected gain values become the contrast gains at the section of YPRE<128.

The image brightness distribution obtained through the above procedures is expressed as Eq. (1) below.

$$Y=(YPRE-128) \times (G\_HIGH)+128; 128 \leq YPRE \leq 235$$

$$Y=(YPRE-128) \times (G\_LOW)+128; 16 \leq YPRE \leq 128 \quad (1)$$

Meanwhile, the case of the uniform gain contrast, the image brightness distribution is expressed as Eq. (2) below $$Y=(YPRE-128) \times (GCONST)+128; 16 \leq YPRE \leq 235 \quad (2)$$

where GCONST represents the uniform contrast gain.

When the uniform gain contrast scheme and the dual gain contrast scheme are respectively applied, the comparisons of the image brightness distributions with respect to the low contrast images, the high contrast images, the bright images, and the dark images will be described below.

Figure 5A:
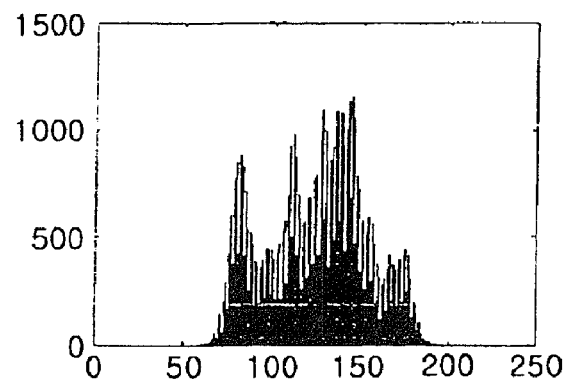
FIGS. 5A to 5C are graphs illustrating the comparison of low contrast images according to the prior art and the present invention.
Figure 5B:
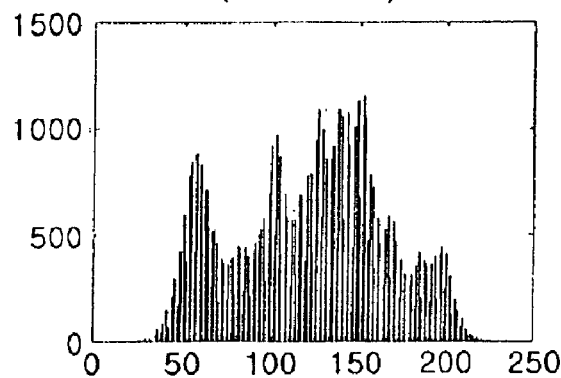
Figure 5C:
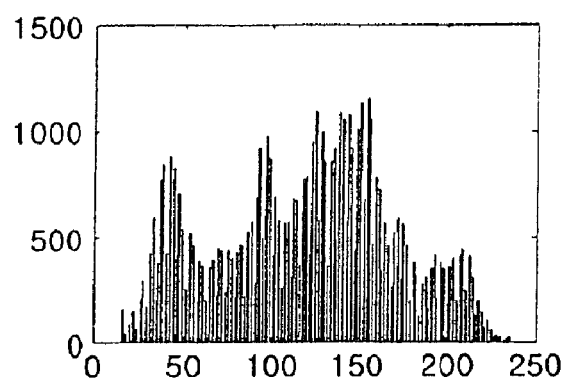

FIGS. 5A to 5C are histograms for comparing the image brightness distributions of the low contrast images according to the uniform gain contrast scheme of the prior art and the dual gain contrast scheme of the present invention.

Specifically, FIG. 5A illustrates an original image of the low contrast image, FIG. 5B illustrates the image brightness distribution when the uniform gain contrast scheme is applied, and FIG. 5C illustrates the image brightness distribution when the dual gain contrast scheme is applied. In FIG. 5B, the uniform gain contrast (GCONST) is 1.5.

As illustrated in FIG. 5B, when the uniform gain contrast scheme is applied, the gain is always constant regardless of images and thus the histogram of the converted image is distributed over a partial region, not the entire region. On the contrary, as illustrated in FIG. 5C, when the dual gain contrast scheme is applied, the histogram of the converted image is distributed over the entire region and thus the image having more excellent brightness distribution can be obtained.

Figure 6A:
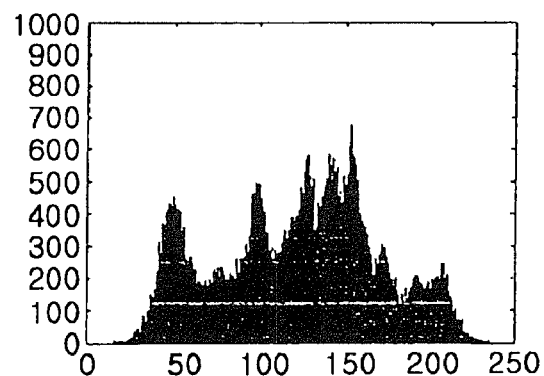
FIGS. 6A to 6C are graphs illustrating the comparison of high contrast images according to the prior art and the present invention.
Figure 6B:
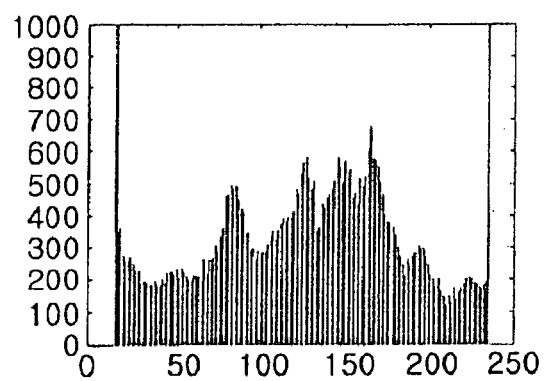
Figure 6C:
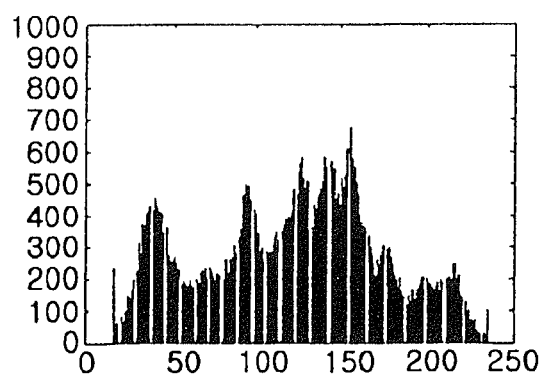

FIGS. 6A to 6C are histograms for comparing the image brightness distributions of the high contrast images according to the uniform gain contrast scheme of the prior art and the dual gain contrast scheme of the present invention.

Specifically, FIG. 6A illustrates an original image of the high contrast image, FIG. 6B illustrates the image brightness distribution when the uniform gain contrast scheme is applied, and FIG. 6C illustrates the image brightness distribution when the dual gain contrast scheme is applied. In FIG. 6B, the uniform gain contrast (GCONST) is 1.5.

As illustrated in FIG. 6B, when the uniform gain contrast scheme is applied, data are largely distributed in regions of $0 \leq Y \leq 16$ and $235 \leq Y \leq 250$. On the contrary, as illustrated in FIG. 6C, when the dual gain contrast scheme is applied, no data exist in regions of $0 \leq Y \leq 16$ and $235 \leq Y \leq 250$. That is, in the case of the high contrast image, since the histogram of the brightness distribution is already distributed uniformly, it is unnecessary to control the brightness distribution due using the contrast. However, when the uniform gain contrast scheme is applied, the same uniform gain is added equally, many data are distributed in regions of 0≦Y≦16 and 235≦Y≦250, causing the image degradation.

Figure 7A:
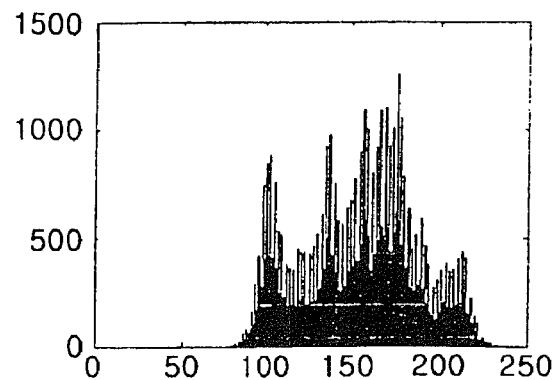
FIGS. 7A to 7C are graphs illustrating the comparison of bright images according to the prior art and the present invention.
Figure 7B:
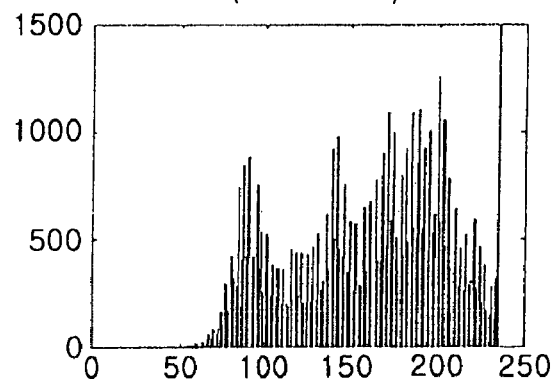
Figure 7C:
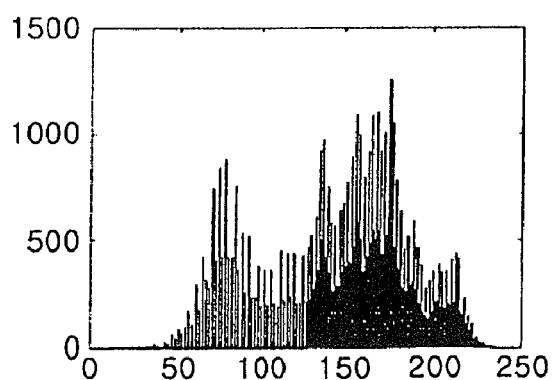

FIGS. 7A to 7C are graphs for comparing the image brightness distributions of the bright images according to the uniform gain contrast scheme of the prior art and the dual gain contrast scheme of the present invention.

Specifically, FIG. 7A illustrates an original image of the bright image, FIG. 7B illustrates the image brightness distribution when the uniform gain contrast scheme is applied, and FIG. 7C illustrates the image brightness distribution when the dual gain contrast scheme is applied. In FIG. 7B, the uniform gain contrast (GCONST) is 1.5.

In the case of the bright image, the histogram of the brightness distribution is largely distributed in the region of Y>128. Meanwhile, as illustrated in FIG. 7B, when the uniform gain contrast scheme is applied, many data are distributed in the region of Y=235. On the contrary, as illustrated in FIG. 7C, when the dual gain contrast scheme is applied, there is almost no change in the region of Y>128, compared with the original image. The brightness distribution was controlled only in the region of Y<128. At this point, since the gain low value G_LOW is greater than the maximum gain value G_MAX (for example, set to 2) in the region of Y<128, the maximum gain value G_MAX was used in the region of Y<128.

Figure 8A:
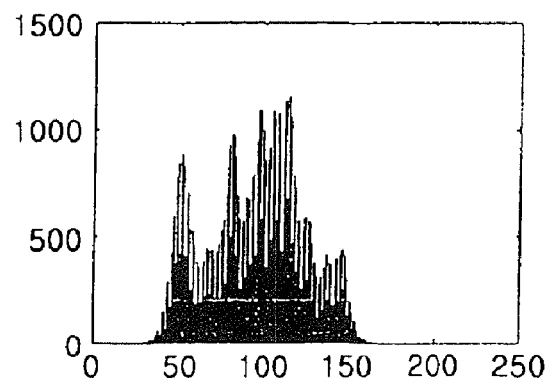
FIGS. 8A to 8C are graphs illustrating the comparison of dark images according to the prior art and the present invention.
Figure 8B:
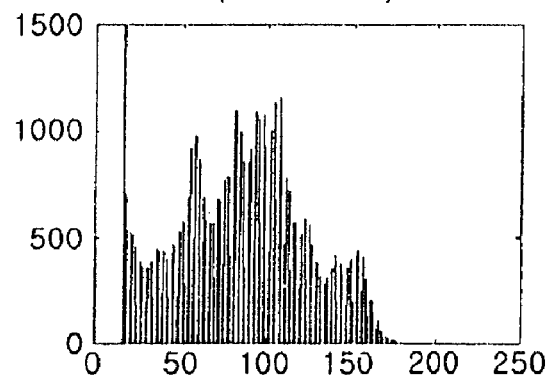
Figure 8C:
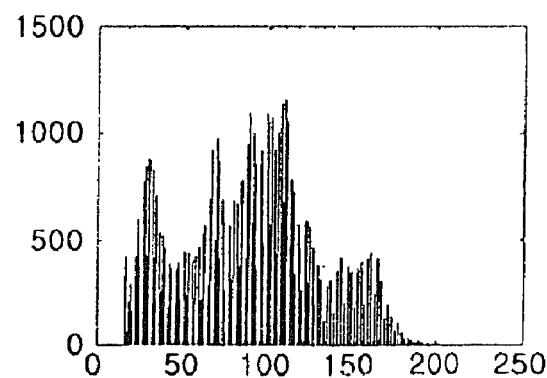

FIGS. 8A to 8C are histograms for comparing the image brightness distributions of the dark contrast images according to the uniform gain contrast scheme of the prior art and the dual gain contrast scheme of the present invention.

Specifically, FIG. 8A illustrates an original image of the dark image, FIG. 8B illustrates the image brightness distribution when the uniform gain contrast scheme is applied, and FIG. 8C illustrates the image brightness distribution when the dual gain contrast scheme is applied. In FIG. 8B, the uniform gain contrast (GCONST) is 1.5.

In the case of the dark image, the histogram of the brightness distribution is largely distributed in the region of Y<128. Meanwhile, as illustrated in FIG. 8B, when the uniform gain contrast scheme is applied, many data are distributed in the region of Y=16 On the contrary, as illustrated in FIG. 8C, when the dual gain contrast scheme is applied, the gain low value G_LOW in the region of Y<128 is determined as being relatively small and the gain high value G_HIGH in the region of Y>128 is determined as being greater than the maximum gain value G_MAX. Therefore, the maximum gain value G_MAX was used.

As described above, the dual contrast gains of the dark region and the bright region are determined using the minimum data of the dark region and the maximum data of the bright region, and then the image brightness distribution is adjusted using the dual contrast gains. Consequently, it is possible to solve the limitation in expanding the output dynamic range caused when the uniform gain contrast scheme is applied. Also, the reduction of the input dynamic range can be prevented, thereby stably adjusting the image brightness distribution.

The present application contains subject matter related to Korean patent application No. 2005-128695, filed in the Korean Intellectual Property Office on Dec. 23, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An image sensor comprising:
a contrast gain adjuster configured to:
adjust a brightness distribution of an image detected from a pixel array;
calculate a minimum brightness value of a dark region of the image and a maximum brightness value of a bright region of the image;
determine a first contrast gain of the dark region of the image based on the minimum brightness value and a second contrast gain of the bright region of the image based on the maximum brightness value; and
compare a brightness value of a pixel with the minimum brightness value and to update the minimum brightness value with the brightness value of the pixel if the brightness value of the pixel is less than the minimum brightness value.

2. The image sensor of claim 1, wherein the dark region of the image and the bright region of the image are divided according to a reference value.

3. The image sensor of claim 1, wherein the contrast gain adjuster is further configured to compare the brightness value of the pixel with the maximum brightness value and to update the maximum brightness value with the brightness value of the pixel if the brightness value of the pixel is greater than the maximum brightness value.

4. The image sensor claim 3, wherein the contrast gain adjuster is further configured to determine a gain low value based on the minimum brightness value and to compare the gain low value with a maximum gain value to select one of the gain low value and the maximum gain value.

5. The image sensor of claim 4, wherein the contrast gain adjuster is further configured to determine a gain high value based on the maximum brightness value and to compare the gain high value with the maximum gain value to select one of the gain high value and the maximum gain value.

6. An image sensor comprising:
a pixel array configured to detect an image and to generate analog pixel data;
an analog-to-digital converter configured to convert the analog pixel data into RGB pixel data;
a color space converter configured to convert the RGB pixel data into YCbCr pixel data; and
a contrast gain adjuster configured to adjust a brightness distribution of the image by calculating both a minimum brightness value of a dark region of the image and a maximum brightness value of a bright region of the image from the YCbCr pixel data and by determining a first contrast gain of the dark region of the image based on the minimum brightness value and a second contrast gain of the bright region of the image based on the maximum brightness value;
wherein the contrast gain adjuster is further configured to compare a brightness data value of the YCbCr pixel data with the minimum brightness value and to calculate the minimum brightness value by updating the minimum brightness value with the brightness data value of the YCbCr pixel data if the brightness data value of the YCbCr pixel data is less than the minimum brightness value.

7. The image sensor of claim 6, wherein the dark region of the image and the bright region of the image are divided according to a reference value.

8. The image sensor of claim 6, wherein the contrast gain adjuster is further configured to compare the brightness data value of the YCbCr pixel data with the maximum brightness value and to calculate the maximum brightness value by updating the maximum brightness value with the brightness data value of the YCbCr pixel data if the brightness data value of the YCbCr pixel data is greater than the maximum brightness value.

9. The image sensor of claim 8, wherein the contrast gain adjuster is further configured to determine a gain low value based on the minimum brightness value and to compare the gain low value with a maximum gain value to select one of the gain low value and the maximum gain value.

10. The image sensor of claim 9, wherein the contrast gain adjuster is further configured to determine a gain high value based on the maximum brightness value and to compare the gain high value with the maximum gain value to select one of the gain high value and the maximum gain value.

11. The image sensor of claim 6, further comprising:
a correlated double sampling circuit configured to remove a fixed pattern noise from the analog pixel data; and
a variable amplifier configured to amplify the analog pixel data outputted from the correlated double sampling circuit and to output the analog pixel data to the analog-to-digital converter.

12. The image sensor of claim 6, further comprising:
a color interpolator configured to interpolate a 1-channel digital pixel data from the analog-to-digital converter into a 3-channel RGB data; and
a color corrector configured to correct the 3-channel RGB data and to output the corrected 3-channel RGB data to the color space converter.

13. A method for controlling a brightness distribution of an image detected from a pixel array of an image sensor, the method comprising:
calculating a minimum brightness value of a dark region of the image and a maximum brightness value of a bright region of the image; wherein the dark region of the image and the bright region of the image are divided according to a reference value;
determining a first contrast gain of the dark region of the image in response to the minimum brightness value and a second contrast gain of the bright region of the image in response to the maximum brightness value;
comparing a brightness data value of a pixel with the minimum brightness value; and
updating the minimum brightness value with the brightness data value of the pixel if the brightness data value is less than the minimum brightness value.

14. The method of claim 13 further comprising:
comparing the brightness data value of the pixel with the maximum brightness value; and
updating the maximum brightness value with the brightness data value of the pixel if the brightness data value of the pixel is greater than the maximum brightness value.

15. The method of claim 14, further comprising:
determining a gain low value based on the minimum brightness value;
comparing the gain low value with a maximum gain value; and
selecting one of the gain low value and the maximum gain value.

16. The method of claim 14, further comprising:
determining a gain high value based on the maximum brightness value;
comparing the gain high value with the set maximum gain value to select one of the gain high value and the maximum gain value.

17. A method for controlling a brightness distribution of an image detected from a pixel array of an image sensor, the method comprising:
setting an initial minimum brightness value, an initial maximum brightness value, a brightness threshold value, and a maximum gain value;
dividing the image into a dark region and a bright region based on a reference value;
calculating a minimum brightness value of the dark region and a maximum brightness value of the bright region by comparing a brightness data value of pixel data from the pixel array, the initial minimum brightness value, and the initial maximum brightness value;
determining a gain low value based on the minimum brightness value and a gain high value based on the maximum brightness value;
selecting a first contrast gain to be applied to the dark region by comparing the maximum gain value with the gain low value; and
selecting a second contrast gain to be applied to the bright region by comparing the maximum gain value with the gain high value.

18. The method of claim 17, further comprising:
determining a corresponding pixel data as noise if the brightness data value of the pixel data is less than the brightness threshold value.

19. The method of claim 18, wherein the minimum brightness value and the maximum brightness value are calculated by comparing the brightness data value of the pixel data, the initial minimum brightness value, and the initial maximum brightness value.

20. The method of claim 19, wherein if the brightness data value of the pixel data is greater than the initial minimum brightness value, the initial minimum brightness value is set as the minimum brightness value.

21. The method of claim 20, wherein if the brightness data value of the pixel data is less than the initial maximum brightness value, the initial maximum brightness value is set as the maximum brightness value.

22. The method of claim 21, wherein if the maximum gain value is greater than the gain low value, the gain low value is selected as the first contrast gain.

23. The method of claim 22, wherein if the maximum gain value is less than the gain low value, the maximum gain value is selected as the first contrast gain.

24. The method of claim 23, wherein if the maximum gain value is greater than the gain high value, the gain high value is selected as the second contrast gain.

25. The method of claim 24, wherein if the maximum gain value is less than the gain high value, the maximum gain value is selected as the second contrast gain.

26. An image sensor comprising:
a dual gain contrast adjuster configured to:
receive a current pixel brightness value;
set a minimum brightness value to be equal to an initial minimum brightness value;
compare the minimum brightness value with the current pixel brightness value;
set the minimum brightness value to be equal to the current pixel brightness value if the current pixel brightness value is less than the minimum brightness value; and
maintain the minimum brightness value if the current pixel brightness value is greater than the minimum brightness value.

27. The image sensor of claim 26, wherein the dual gain contrast adjuster is further configured to ignore the current pixel brightness value if the current pixel brightness value is less than a threshold value.

28. The image sensor of claim 26, wherein the dual gain contrast adjuster is further configured to determine a gain low value according to the minimum brightness value.

29. The image sensor of claim 28, wherein the dual gain contrast adjuster is further configured to set the gain low value to be a maximum gain value if the maximum gain value is less than the gain low value.

30. The image sensor of claim 26, wherein the dual gain contrast adjuster is further configured to:
    set a maximum brightness value to be equal to an initial maximum brightness value;
    compare the maximum brightness value with the current pixel brightness value;
    set the maximum brightness value to be the current pixel brightness value if the current pixel brightness value is greater than the maximum brightness value; and
    maintain the maximum brightness value if the current pixel brightness value is less than the maximum brightness value.

31. The image sensor of claim 30, wherein the dual gain contrast adjuster is further configured to determine a gain high value according to the maximum brightness value.

32. The image sensor of claim 31, wherein the dual gain contrast adjuster is further configured to set the gain high value to be a maximum gain value if the maximum gain value is less than the gain high value.

33. The image sensor of claim 30, wherein the current pixel brightness value is compared to the maximum brightness value if the current pixel brightness value is greater than a reference value.

34. The image sensor of claim 26, further comprising:
    a pixel array configured to sense an image and output analog pixel data;
    a correlated double sampling circuit configured to remove a fixed pattern noise from the analog pixel data;
    a gain amplifier configured to amplify the analog pixel data; and
    an analog-to-digital converter configured to convert the analog pixel data into RGB digital pixel data.

35. The image sensor of claim 34, further comprising:
    a gamma corrector configured to correct a gamma of the digital pixel data;
    a color interpolator configured to interpolate 1-channel RGB digital pixel data into 3-channel RGB digital pixel data;
    a color corrector configured to correct a color of the 3-channel RGB digital pixel data; and
    a color space converter configured to convert the 3-channel RGB digital pixel data into YCbCr digital pixel data.

36. A method for adjusting a contrast of an image, the method comprising:
    setting a minimum brightness value to an initial minimum brightness value;
    comparing current brightness pixel data to a reference value;
    comparing the current brightness pixel data to the minimum brightness value if the current brightness pixel data is less than the reference value;
    setting the minimum brightness value to be equal to the current brightness pixel data if the current brightness pixel data is less than the minimum brightness value; and
    setting a first gain value according to the minimum brightness value.

37. The method of claim 36, further comprising setting the first gain value to be equal to a maximum gain value if the first gain value is greater than the maximum gain value.

38. The method of claim 36, further comprising ignoring the current pixel brightness data if the current pixel brightness data is less than a threshold.

39. The method of claim 36, further comprising:
    setting a maximum brightness value to an initial maximum brightness value;
    comparing the current brightness pixel data to the maximum brightness value if the current brightness pixel data is greater than the reference value;
    setting the maximum brightness value to be equal to the current brightness pixel data if the current brightness pixel data is greater than the maximum brightness value; and
    setting a second gain value according to the maximum brightness value.

40. The method of claim 39, further comprising setting the second gain value to be equal to a maximum gain value if the second gain value is greater than the maximum gain value.

* * * * *